United States Patent [19]
Bartsch

[11] Patent Number: 4,725,194
[45] Date of Patent: Feb. 16, 1988

[54] SELF-REGULATING VERTICAL AXIS WINDMILL

[76] Inventor: Ronald V. Bartsch, R.R. 1, Box 8A, Johnson, Minn. 56250

[21] Appl. No.: 914,646

[22] Filed: Oct. 2, 1986

[51] Int. Cl.$^4$ ............................. F03D 3/04; F03D 7/06
[52] U.S. Cl. ............................................ 415/4; 415/49
[58] Field of Search ............... 415/2 R, 3 R, 4 R, 45, 415/49

[56] References Cited

U.S. PATENT DOCUMENTS

| | | | |
|---|---|---|---|
| 127,771 | 6/1872 | Hosey | 415/4 |
| 169,051 | 10/1875 | Short | 415/4 R |
| 177,597 | 5/1876 | Ward | 415/4 |
| 250,806 | 12/1881 | Hamel | 415/3 |
| 273,642 | 3/1883 | Toombs | 415/3 R |
| 356,145 | 1/1887 | McKenzie | 415/3 R |
| 570,123 | 10/1896 | Clinton | 415/4 R |
| 772,786 | 10/1904 | Clifford | 415/3 R |
| 1,008,148 | 11/1911 | Hibbs | 415/3 R |
| 1,127,400 | 2/1915 | Cain | 415/3 R |
| 1,234,405 | 7/1917 | Solomon | 415/3 R |
| 1,382,591 | 6/1921 | Ackermann | 415/4 R |
| 4,039,849 | 8/1977 | Mater et al. | 290/55 |
| 4,047,834 | 9/1977 | Magoveny et al. | 415/3 |
| 4,115,027 | 9/1978 | Thomas | 415/2 |
| 4,571,152 | 2/1986 | Tatar | 415/4 |

FOREIGN PATENT DOCUMENTS

| | | | |
|---|---|---|---|
| 22663 | 8/1921 | France | 415/3 R |
| 24581 | 9/1922 | France | 415/3 R |
| 557862 | 8/1923 | France | 415/45 |
| 595500 | 10/1925 | France | 415/3 R |
| 846661 | 9/1939 | France | 415/3 R |
| 49378 | 3/1984 | Japan | 415/45 |

Primary Examiner—Everette A. Powell, Jr.
Attorney, Agent, or Firm—Kinney & Lange

[57] ABSTRACT

A self-regulating vertical axis windmill includes a wind actuable rotor and a plurality of baffle panels arranged around the outside of the rotor and pivotably mounted on vertical axes which are parallel to the axis of rotation of the rotor. The panels are biased to tend to pivot in a first angular direction to be nominally situated against stop means in position to direct wind blowing toward the rotor axis to be diverted to impinge on a face of the rotor panels which will tend to cause the rotor to rotate in a second opposite angular direction. The baffle panels are arranged so that as the wind increases and impinges on one of the baffle panels in a direction to tend to move that panel in the second opposite angular direction, the panel moves away from the stop means, finally allowing a substantial portion of the wind to impinge on opposite second faces of the rotor panel blades to tend to retard or stop the rotation of the rotor in the second angular direction.

13 Claims, 11 Drawing Figures

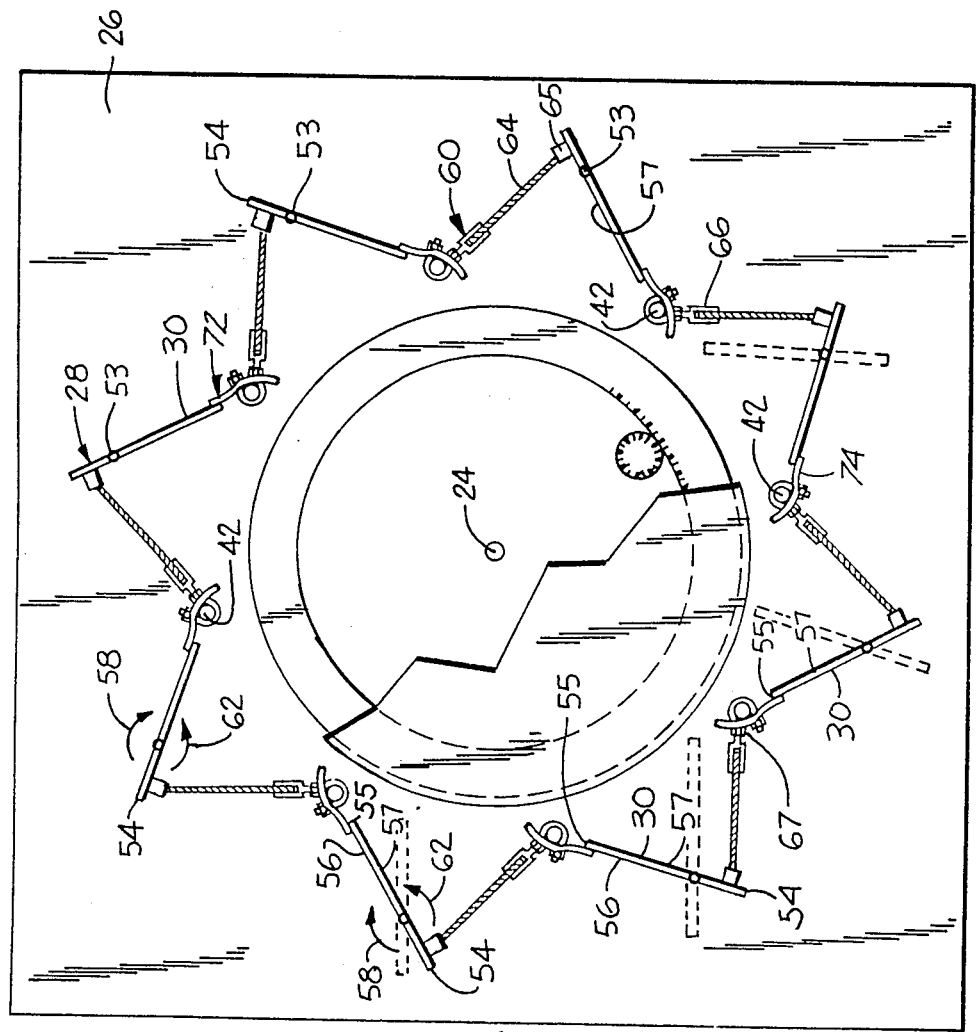
Fig 6
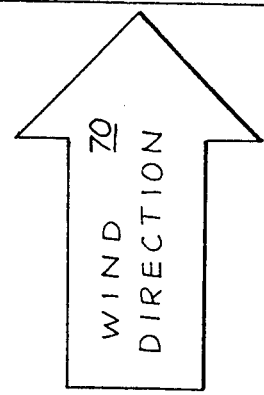
WIND DIRECTION 70

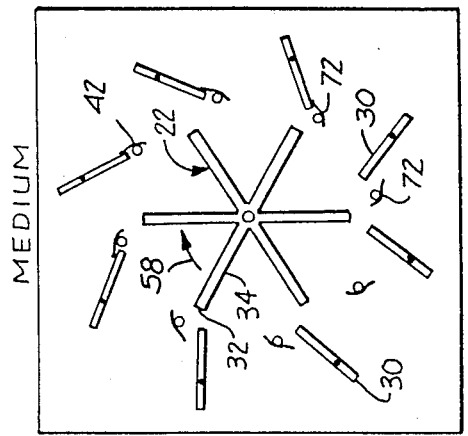
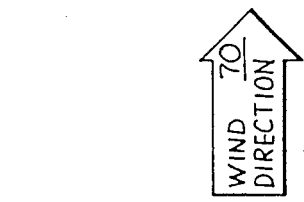
Fig. 8
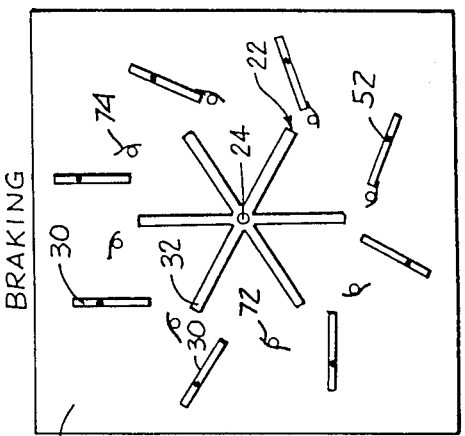
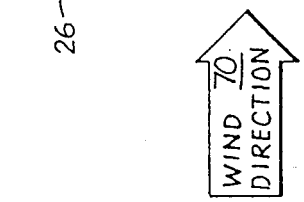
Fig. 10
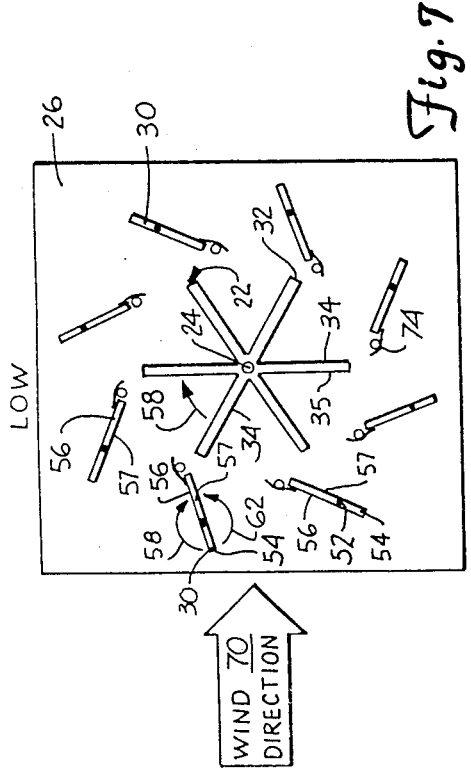
Fig. 7
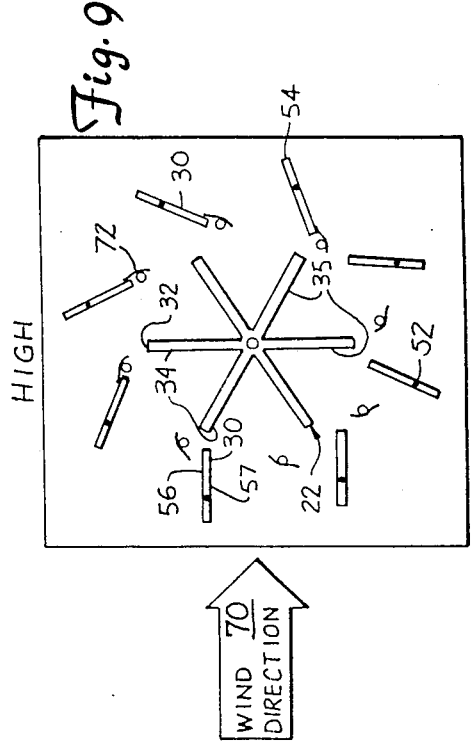
Fig. 9

SELF-REGULATING VERTICAL AXIS WINDMILL

BACKGROUND OF THE INVENTION

1. Field of the Invention

This invention has relation to vertical axis windmills in which movable baffle panels pivot under the variable forces of the wind to tend to regulate the speed of the windmill rotor to keep it from running away as the wind increases without completely deflecting the wind away from the rotor to cause it to shut down.

2. Description of the Prior Art

Windmills are designed to be operative over a wide range of speeds of rotation, those developed under low winds, under medium winds, and under high winds. However, when gale force winds are encountered, there is a danger and even a probability that the windmill will go from a maximum allowable operating speed to a speed at which it will self-destruct.

Efforts to protect windmills from such violet winds have been made over the years. For example, ancient U.S. Pat. No. 177,597, granted to Ward in May of 1896, utilized "outer hinged shutters" pivoted to inner fixed stationary shutters to direct the wind onto an upright wheel or rotor made with spirally curved buckets. The outer hinged shutters were biased by weights to be held in an open position during ordinary wind conditions, and then were forced closed against these weight biases when the wind became too strong. Obviously this would shut down the windmill entirely until such time as the wind could no longer hold the shutters closed against the action of the weighted bias members. Such complete shutdown interrupts the power generated by the windmill.

Ancient U.S. Pat. No. 127,771, granted to Hosey in June of 1872, is another one using weighted doors which, "when being exposed to the wind, become more shut the stronger the wind strikes them." Eventually this also caused unacceptable shutdown and power interruption.

See also U.S. Pat. No. 250,806 granted in December of 1881 to Hamel.

U.S. Pat. No. 4,571,152 granted to Tatar in February of 1986 discloses a structure which attempts to accomplish some of the purposes of the present invention, but without utilizing the inventive concepts of the present invention. The Tatar structure depends on a wind vane assembly which is freely rotatable about an inner rotor and is guided by a large tailfin to keep it aimed into the wind. The difficulty with a commercial version of this device obtained from Tatar by the present inventor encouraged him to develop a device of the present invention which will operate without a rotatable outside wind vane assembly; but will, instead, operate as a self-regulated windmill regardless of the direction of the wind at any particular moment in time.

Other patents cited in a search for the present invention included U.S. Pat. No. 4,039,849 granted to Mater et al August of 1977; U.S. Pat. No. 4,047,834 granted to Magoveny et al in September of 1977; and U.S. Pat. No. 4,115,027 granted to Thomas in September of 1978. These are not believed to be particularly pertinent.

None of this prior art shows a structure whereby winds at very low speed are directed by initially prepositioned baffle panels onto first surfaces of fixed rotor panels of a rotating rotor tending to cause rotation of the rotor in a first direction; then, as winds increase, the baffle panels move to a more open condition directing some of the wind to second opposite rotor panel surfaces; and as the winds become so strong that they endanger the windmill, the baffles continue moving in the open direction to a condition where they are directing much of the wind to hit such second opposite rotor panel surfaces to urge the rotor to tend to rotate the rotor in a direction opposite to the actual rotation of the rotor thus to hold the rotor speed within acceptable limits.

That is what is presented in the present invention. Neither the inventor nor those in privity with him are aware of any prior art which is closer than that discussed above or of any prior art which anticipates the claims herein.

SUMMARY OF THE INVENTION

A self-regulating vertical axis windmill includes a wind actuable rotor having a vertical axis and a plurality of flat rotor panels extending radially outwardly from the axis; means to support the rotor for rotation about its vertical axis; and power conversion means to convert the rotation of the rotor on its axis into useable energy. The rotor panels are partially defined by first and second oppositely facing wind reactive faces.

A plurality of flat generally vertical baffle panels are arranged around the outer edge of the rotor, each such baffle panel having a first wind-receiving face and a second opposite wind-receiving face. Each such baffle panel also has a vertical leading edge and a vertical trailing edge and each such panel is pivotably supported on axis parallel to the rotor axis to be in closely adjacent relation to the rotor. Bias means tends to rotate each baffle panel in a first angular direction, and means is provided to limit rotation of each baffle panel in this first angular direction so that, in low wind or no wind situations, the panels will have a nominal first position relative to the rotor whereby the wind blowing radially toward the rotor axis and striking the baffle panels upwind of at least a portion of the rotor will be directed toward a first wind reaction face of the rotor panels whereby the rotor will tend to rotate in an opposite second angular direction, and whereby the wind will be directed away from a second rotor panel face on the opposite side of the panel from the first face.

The pivot axis of each baffle panel is closer to the leading edge of the panel than it is to the trialing edge of the panel so that wind blowing radially toward the rotor axis and striking the first wind-receiving faces of baffle panels lying upwind from a straight line perpendicular to the direction of the wind and passing through the rotor axis will cause the baffle panel to tend to rotate in said second opposite angular direction against the tendency of the bias means to cause rotation in the first angular direction.

As the wind velocity increases, the force exerted by the bias means to counter the force of the wind on the first wind-receiving faces of the upwind baffle panels determines wind velocity at which the upwind baffles take position substantially in alignment with the wind direction to allow the wind to exert substantially the same force on both the first and second wind reactive faces of the rotor panels.

BRIEF DESCRIPTION OF THE DRAWINGS

FIG. 6 is a top plan view as taken on the line 6—6 in FIG. 2 with parts omitted and parts broken away;

FIGS. 7 through 10 are diagrammatic and schematic views of the rotor and of the pivotable baffle panels of the invention as they would be positioned with respect to each other under various wind conditions.

DETAILED DESCRIPTION OF THE PREFERRED EMBODIMENTS

Figure 1:
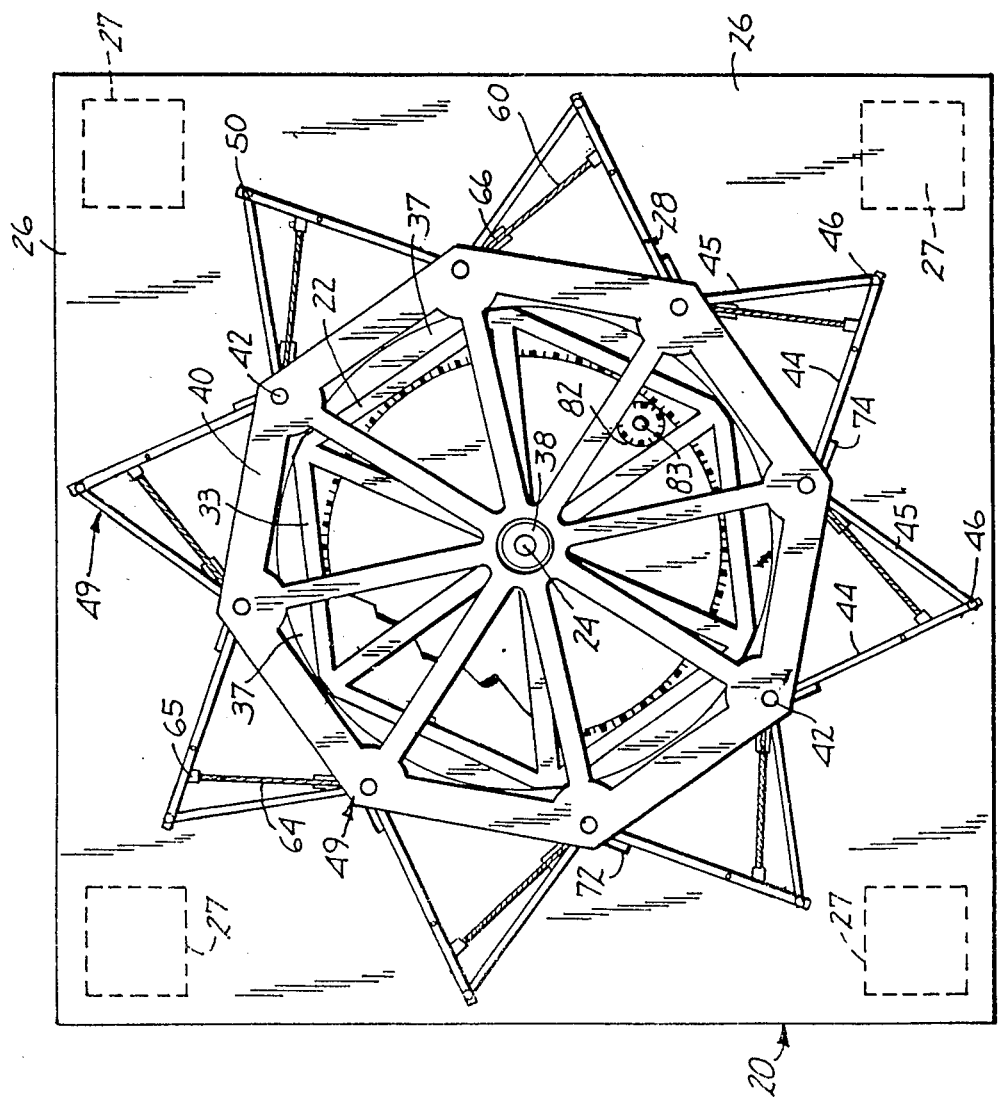
FIG. 1 is a top plan view of a self-regulating vertical axis windmill made according to the present invention.
Figure 2:
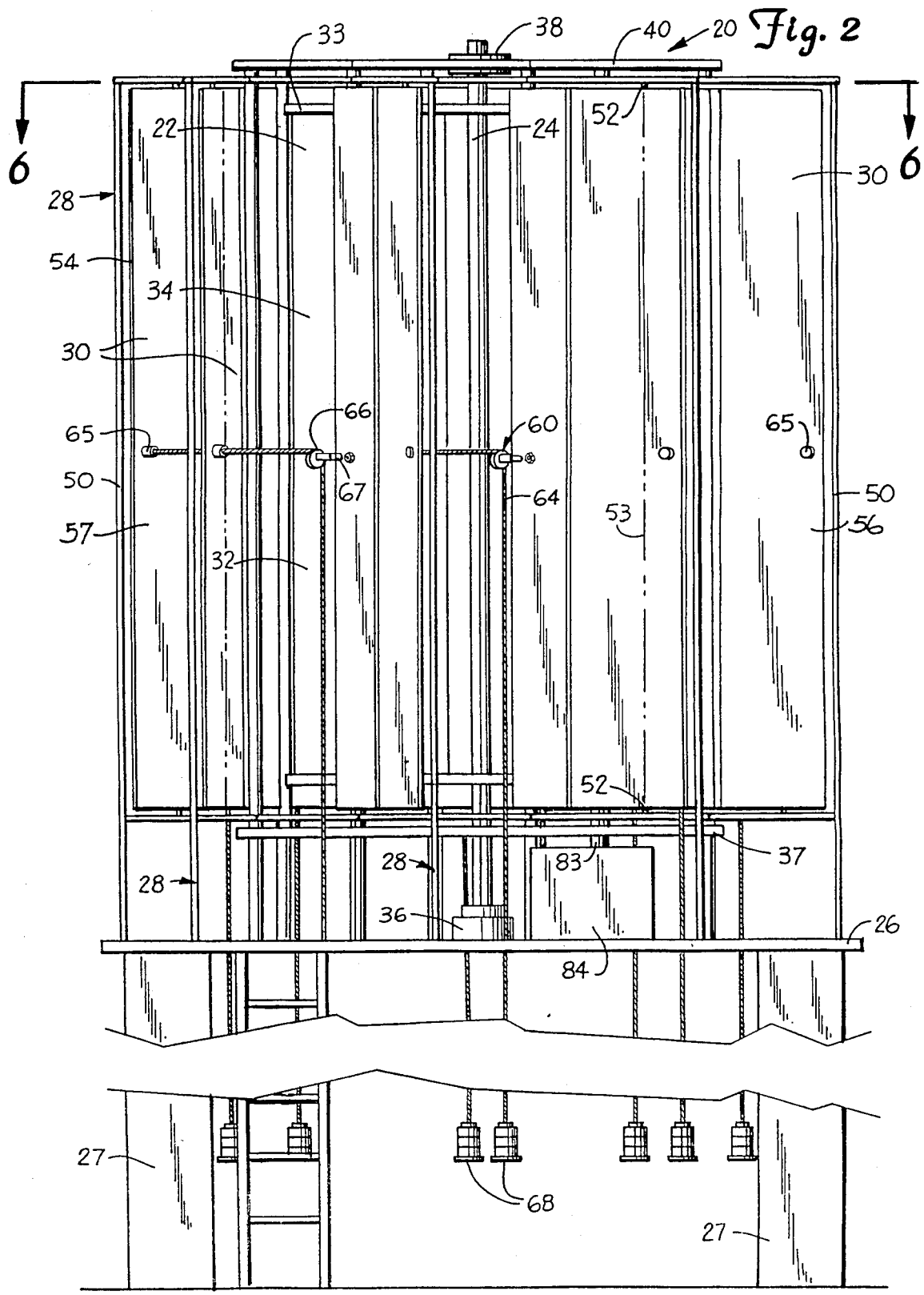
FIG. 2 is a side elevational view of the windmill of FIG. 1

A self-regulating vertical axis windmill 20 made according to the present invention includes a wind actuable rotor 22 rotatably mounted on a vertical axle or axis 24 on a platform or floor 26; and a baffle panel assembly 28 including a plurality of baffle panels 30, each pivotally mounted with respect to the platform 26 in clearing relation, but in close proximity, to the rotor 22. As shown, platform 26 is supported on four stanchions 27. The rotor 20 includes a plurality of wind reaction rotor panels 32, each flat rotor panel extending radially outwardly from the axis 24. Each rotor panel is partially defined by a first wind reactive face 34 designed to be driven by the wind under low to medium wind conditions and a second opposite face 35 designed to be substantially shielded from the wind under such low to medium wind conditions. Rotor panels 32 are positioned between a polygonal spider-like top plate 33 and a discoid bottom plate 37.

Axle 24 of the rotor 22 is rotatably supported with respect to the platform 26 by a vertical axis thrust bearing 36; and by a vertical axis upper bearing 38 mounted in a fixed polygonal spider-like rotor axle support plate 40. This support plate is fixedly mounted with respect to the platform 26 on a plurality of vertical support columns 42. These vertical support columns 42 are closely adjacent, but in clearing relation, to the outermost vertical edges of the rotor panels 32 as the rotor 22 rotates.

Each of the vertical support columns 42 has an upper pair of horizontal spars 44 and 45 extending radially outwardly from it. A first spar 44 extending from each of the columns 42 is connected as at 46 with a second spar 45 extending from its next adjacent column. Together, the rotor axle support plate 40 and all the horizontal spars 44 and 45 form part of a horizontal upper panel axle support assembly 49.

Each of these columns 42 also has a lower pair of horizontal spars, a first spar 47 and a second spar 48, extending radially outwardly from it and in parallel relation to first spars 44 and second spar 45, respectively.

The baffle panel assembly 28 includes, in addition to baffle panels 30, and horizontal spars 44, 45, 47 and 48, a plurality of baffle positioning rods 50, one extending downwardly from each connection point 46 of each pair of spars 44 and 45 to the platform 26.

Each baffle panel 30 has stub upper and lower axles 52 extending vertically therefrom to define a baffle panel pivot axis 53. Each baffle panel is partially defined by a leading edge 54, a trailing edge 55, a first wind-receiving baffle panel face 56 positioned to receive and deflect the wind before it reaches the rotor panels, and an opposite, parallel, second baffle panel face 57.

The axles 52 are pivotably mounted to first spars 44 and 47. Each baffle panel 30 is provided with a bias means 60 tending to cause the panel 30 to rotate in a first angular direction 62. See FIG. 6.

In the form of the invention as shown, the bias means 60 includes a flexible bias line 64 secured as at 65 to the second baffle panel face 57, running through a pulley 66 which is secured to an adjacent support column 42 as at 67. The bias means also includes a weight 68 attached onto the end of flexible bias line 64. The line 64 is secured to baffle panel 30 between the leading edge 54 and the baffle panel pivot axis 53. The biasing force can be adjusted by adding or subtracting from the weights 68.

Axles 52 extend vertically from panels 30 from position closer to the leading edge 54 than to the trailing edge 55 of these panels. This ensures that any wind impinging on the first wind-receiving baffle panel face 56 will tend to cause the panel to rotate in the second opposite angular direction 58 around the baffle panel pivot axis 53. See FIG. 6.

In the form of the invention as shown, there are six fixedly mounted wind reaction rotor panels 32, and there are eight baffle panels 30 and eight vertical support columns 42. A greater or lesser number of rotor panels and/or baffle panels can be used in accordance with the present invention; but initial results with the combination illustrated herein have, to date, proved most satisfactory.

A satisfactory positioning of the baffle panels under conditions of no wind and of very low wind is illustrated in FIGS. 6 and 7. In these figures and throughout the drawings, a large directional arrow 70 indicates generally the wind direction for purposes of explanation only. As probably most easily seen in FIG. 7, even a gentle breeze coming from the left in that figure will be directed against the first wind reactive faces 34 of the rotating rotor panels 32, tending to cause the rotor 22 to rotate in the second angular direction 58. Note that the wind passing between the leading edges 54 of the first two upwind baffle panels 30 to the left in FIGS. 6 and 7 will be compressed and accelerated as it leaves the trailing edges 55 of those panels. By the venturi effect, a condition of reduced pressure will be produced immediately adjacent the trailing edge of the lowermost of those two rotor panels thus further encouraging the rotor to turn in the second angular direction 58.

The positioning of the baffle panels 30 as seen in FIGS. 6 and 7 is maintained against the urging of bias means 60 by providing a stop means 72 limiting the movement of each baffle panel 30 in the first angular direction 62 under the urging of the bias means. In the form of the invention as shown, each stop means 72 is in the form of a flange 74 welded or otherwise fixedly positioned on the next adjacent vertical support column 42, and extends outwardly into the path of the trailing edge 55 of the baffle panel 30. This flange 74 does double duty as a baffle panel stop and as an air flow guide to smoothly guide the incoming wind from adjacent baffle panel 30, past the vertical column 42, and on to drive against the panels of the rotor 22. Flanges 74 can extend for the entire vertical dimension of the baffle panels 30.

As the low wind increases to a wind of medium velocity, the baffle panels 30 will move from the positions as seen in FIG. 7 to approximately the positions as seen in FIG. 8. This movement is against the force of bias means 60, and what constitutes a medium wind and what constitutes a low wind can be determined by the windmill operator and depends on the mass of the weights 68 forming part of the bias means 60. The weights will be such that from whatever direction the wind comes, for example from the left as seen in FIG. 8, the force of the wind on the first wind-receiving baffle panel faces 56 will at some point begin to overcome the bias means 60, and the baffle panels 30 will move to positions somewhat as seen in FIG. 8. The panels 30 on the side toward the source of the wind will move away from the flanges 74 forming the stop means 72 without initially having much retarding effect on the rotor 22, and the rotor will rotate more vigorously than it was rotating under low wind forces as seen in FIG. 7, because of the increase in the force of the wind.

As the wind gets stronger and stronger, however, the baffle panels 30 will move more like weather vanes into a downwind direction into substantial alignment with the wind as seen in FIG. 9. As will be clearly seen in FIG. 9, such deflection of the two upwind baffle panels causes substantially equal amounts of the wind be directed against the first faces 34 and the second faces 35 of the rotor panels 32 thus tending to reduce the effect of the increased wind velocity on the speed of rotation of the rotor 22. The wind velocity at which the upwind baffles take the position as seen in FIG. 9 is determined by the magnitude of the weights 68 forming part of the bias means 60.

Certain of the baffles 30 which are not between the wind source and the rotor will be held firmly in place against the stop means 72 because the wind is impinging on them on the second baffle panel face 57, and this wind striking that side of the baffle panels will tend to keep the rotor rotating in the second angular direction 58. Because of this fact, the rotor will keep turning in the second angular direction 58 and keep delivering power, although at reduced speed, even in high wind conditions.

As the wind veers from the position shown by the large arrow 70, there will be no difference in the operation of the device at all except that different panels 30 will become the upwind panels and all panels in the same relative position with respect to the wind direction will act in the same manner as the baffle panels 30 illustrated in FIGS. 7, 8 and 9. In other words, the action of the windmill will be identical regardless of the direction of the wind or regardless of the change in direction of the wind.

In gale wind conditions or where very strong straight line winds are present or are expected, it will sometimes be desirable to disable the windmill so that it will have substantially the same force on both the first face 34 and the second face 35 of the rotor panels 32. Also, there are times when the operator of the windmill will find, upon periodically checking up on it, that it is tending to "run away" in sudden very high wind conditions. It is then desirable or imperative to reverse the effect of the flow of wind on the rotor panels so as to slow the rotor down and/or to stop it entirely so that it, itself, can be locked against any further rotation until the cessation of such abnormally high winds.

Illustrated in FIG. 10 is one desirable configuration of static positioning of the baffle panels 30 which can be used to accomplish this slowdown or stoppage of the rotor to keep it from self-destructing.

Another configuration which will be helpful to disable to rotor by ensuring that the wind will arrive equally against first face 34 and second face 35 is to lock the baffle panels 30 in position so that they each lie in radial alignment with the vertical axis 24 of the rotor.

Figure 11:
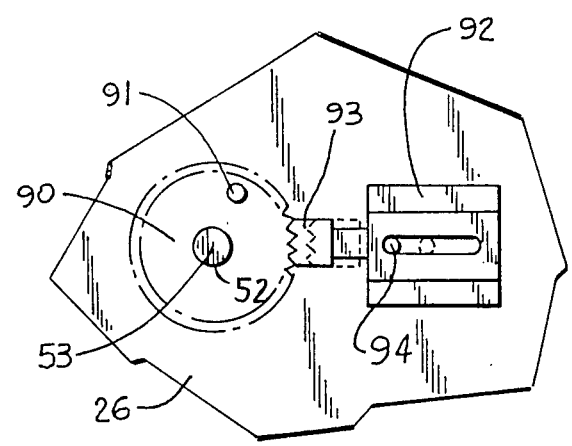
FIG. 11 is a fragmentary bottom plan view taken from below a floor or platform of the windmill and showing one of a plurality of baffle panel positioning means useful to fixedly position the baffle panels to tend to halt and prevent rotation of the rotor under gale conditions.
Figure 4:
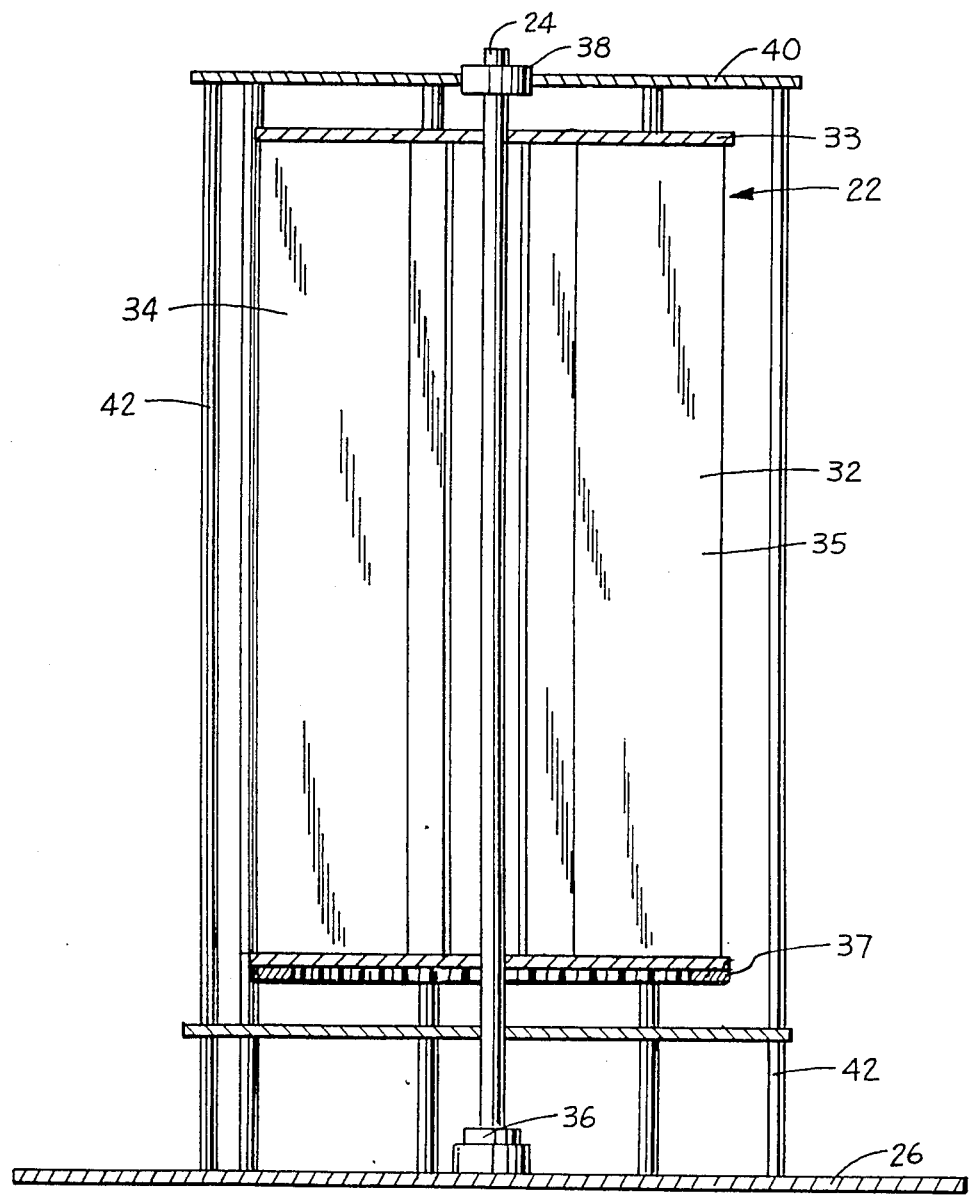
FIG. 4 is a fragmentary vertical sectional view taken on the line 4—4 in FIG. 3 and showing substantially the same parts as shwon in FIG. 3.
Figure 5:
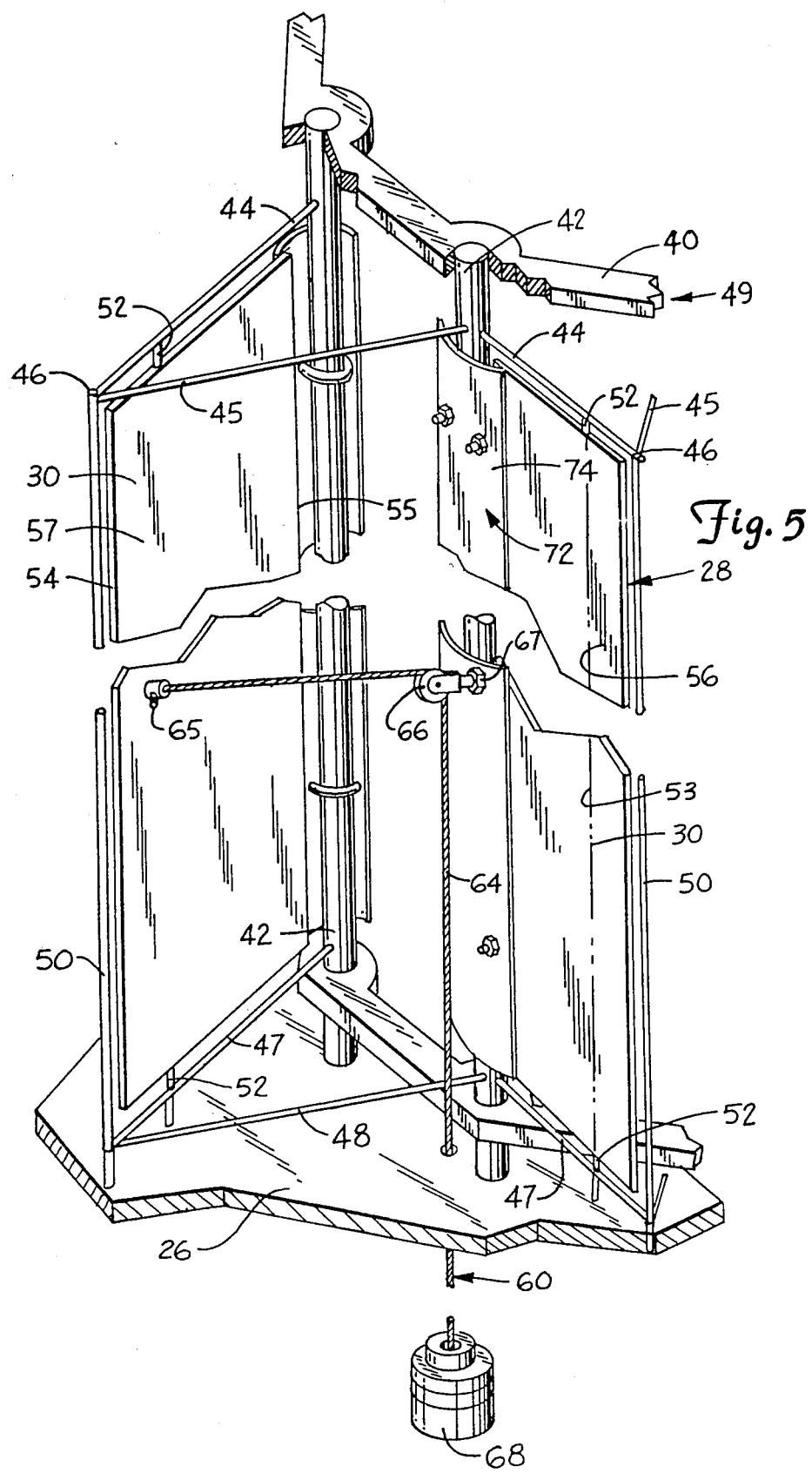
FIG. 5 is a fragmentary perspective view of part of a baffle panel assembly of the windmill and shows the arrangement of adjacent pivotably mounted baffle plates, their bias means and their rotational limiting means.

There can be many kinds of stop means for locking the rotor blades 30 in a desired position until such time as the wind conditions and the need for power are such that it can be allowed to once again operate in a self-regulating manner. A very simple method of manually accomplishing this lockup is disclosed in FIG. 11. In that figure, the lower pivot axle 52 of the panel to the left in FIG. 5, for example, is shown as extending down through the platform 26, and a toothed gear 90 is mounted integrally on a lower end of that axle. This gear 90 has a handle 91 which can be used to rotate it, the stub shaft 52, and therefore the panel 30 to position the panel in any desired directio. When this direction has been achieved, a matching toothed gear segment or stop 93, slidably mounted in a stop mount 92, is moved by a stop handle 94 from the position shown in dotted lines in FIG. 11 in clearing relation to the gear 90 to the gear meshing position seen in full lines where it will prevent any further rotation of that particular panel 30 until it is again manually moved to the dotted clearing position. Each of the other panels will have the same or similar stop and positioning means. When all of the stop means are engaged, the position of the baffle panels 30 can be, for example, as seen in FIG. 10, when the rotor is to be stopped, or when the prevailing wind direction can be anticipated well in advance. Alternatively, the rotor can be stopped and locked mechanically against rotation in any usual or preferred manner (not shown). Then the baffle panels 30 can be locked in position in radial alignment with the axle 24 of the rotor 22 or in any other preferred position.

Figure 3:
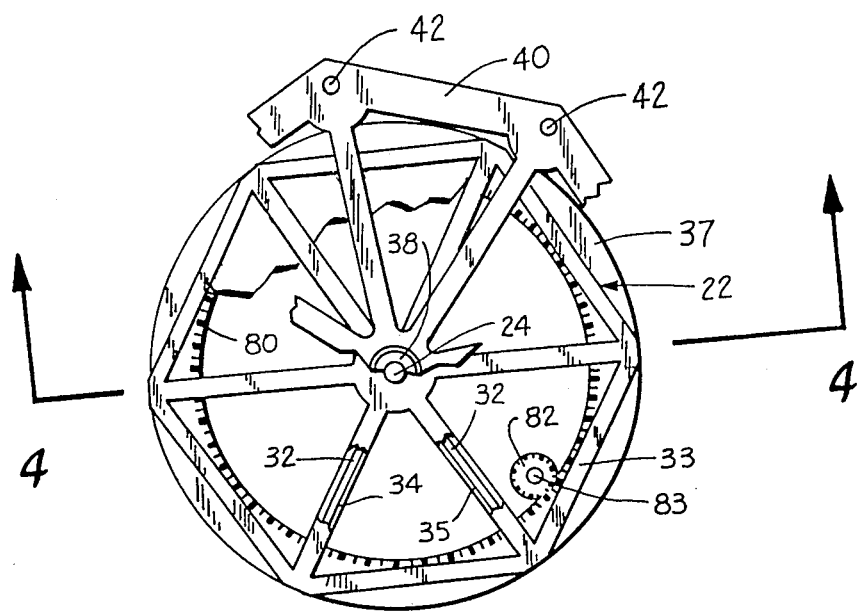
FIG. 3 is a top plan view taken from the same position as in FIG. 1, but showing primarily a fixed blade windmill rotor of the invention with other parts omitted and parts broken away.

As perhaps best seen in FIGS. 1, 3 and 6, the inner edge of discoid rotor bottom plate 37 provides an internal bull gear 80. A pinion 82 is mounted on a pinion shaft 83 which is rotatably mounted with respect to the platform 26. Pinion 82 meshes with internal gear 80 and so transmits rotary motion of the rotor 22 through shaft 83 into an electrical generator 84 or to any other usual or preferred device for converting or utilizing this rotary motion.

As stated above, the platform 26 is supported on stanchions 27. In this way an optimum positioning with respect to the terrain where the windmill is located can be attained.

Although the present invention has been described with reference to preferred embodiments, workers skilled in the art will recognize that changes may be made in form and detail without departing from the spirit and scope of the invention.

What is claimed is:

1. A self-regulating vertical axis windmill includes:
   A. a main frame;
   B. a wind actuable rotor having a vertical axis and a plurality of flat, vertical rotor panels extending radially outwardly from this axis, each rotor panel having a first nominally wind reactive face and a second opposite face;

C. means to support the rotor with respect to the main frame for rotation about its vertical axis;

D. power conversion means to convert the wind generated energy of rotation of the rotor on its axis into useable energy;

E. a plurality of flat, generally vertical baffle panels supported with respect to the main frame and arranged around the outer edge of the rotor, each such baffle panel having a first wind-receiving face and a second opposite wind-receiving face, each such baffle panel also having an outer vertical leading edge and a vertical trailing edge closer to the rotor than its leading edge and each baffle panel being pivotably supported on an axis parallel to the rotor axis to be in closely adjacent relation to the rotor;

F. bias means tending to rotate each baffle panel in a first angular direction;

G. means to limit rotation of each baffle panel in said first angular direction to have a nominal first position relative to the rotor whereby low velocity wind blowing horizontally and radially toward the rotor axis from any direction and striking the first wind-receiving faces of the baffle panels upstream of the rotor will be deflected toward first wind reactive faces of the rotor panels as the rotor rotates whereby the rotor will tend to rotate in a second opposite angular direction and said radially blowing wind will be deflected away from said second rotor panel faces;

H. wherein the pivot axis of each baffle panel is closer to the leading edge of the panel than it is to the trailing edge thereof so that wind blowing radially toward the rotor axis and striking the first wind-receiving faces of the baffle panels lying upwind from a straight line perpendicular to the direction of the wind and passing through the rotor axis will cause such baffle panels to tend to rotate in said second angular direction to bring them into alignment with the wind direction against the tendency of the bias means to cause rotation in the first angular direction; and I. wherein the magnitude of the force exerted by the bias means is such that said upwind baffle panels will move into virtual alignment with the wind direction to allow the wind to impinge substantially equally on both the first and second upwind rotor panel faces to tend to stop rotation of the rotor before the wind reaches a velocity which would otherwise tend to damage or destroy the windmill including the rotating rotor.

2. The windmill of claim 1, wherein:
J. the baffle panels are arranged completely around the outer edge of the rotor and each baffle panel is spaced approximately an equal distance from each of its immediately adjacent baffle panels.

3. The windmill of claim 2 wherein:
K. there are at least three rotor panels extending radially of the rotor axis; and
L. the rotor panels are arranged symmetrically about the rotor axis.

4. The windmill of claim 3 wherein:
M. there are at least four vertical baffle panels.

5. The windmill of claim 3 wherein:

M. the rotor includes six equally spaced-apart rotor panels; and
N. there are eight baffle panels arranged symmetrically around the outer edge of the rotor.

6. The windmill of claim 3 wherein:
M. the rotor includes a top plate and a bottom plate as well as the rotor panels, the rotor panels being supported between the top and bottom plates;
N. the rotor also includes a vertical axle concentric with its vertical axis, said axle being mounted in the top and bottom plates and extending upwardly and downwardly therefrom;
O. the main frame includes a horizontal platform;
P. a horizontal upper panel axle support assembly is mounted in general parallel relationship to said platform on a plurality of vertical support columns extending upwardly from said platform; and
Q. the rotor axle is supported on said platform with respect to said upper panel axle support assembly for rotational movement of the rotor.

7. The windmill of claim 6 wherein:
R. a baffle panel assembly includes said upper panel axle support assembly, said vertical support columns and said baffle panels; and
S. each of said baffle panels is provided with an upper and lower pivot axle coincident with its pivot axis and pivotably mounted with respect to the horizontal upper panel axle support assembly and the platform.

8. The windmill of claim 7 wherein:
T. there are the same number of vertical support columns as there are baffle panels; and
U. the means to limit rotation of each baffle panel in the first angular direction includes stop means extending integrally from an adjacent vertical support column and into interfering relation to a trailing edge portion of that baffle panel.

9. The windmill of claim 8 wherein:
V. the baffle panel stop means is constituted as a flange integral with its vertical support column and extending the entire vertical dimension of the trailing edge of the baffle panel.

10. The windmill of claim 7 wherein:
T. the bias means includes a flexible line operably attached to each panel on the leading edge side of the panel with respect to the baffle panel pivot axis, a pulley fixedly mounted with respect to an adjacent vertical support column and encompassing said flexible line, and a weight suspended on the flexible line below the pulley.

11. The windmill of claim 1; and
J. means operable to lock each baffle panel in a predetermined position to prevent it from being moved by the action of the wind.

12. The windmill of claim 7; and
T. means operable to lock each baffle panel in any desired predetermined position; and
U. said locking means including a gear mounted on said baffle panel axle, means to rotate said baffle panel to a desired position, and means selectively operable to engage said gear to prevent its pivotal movement and to move to position in clearing relation with respect to said gear.

13. The windmill of claim 1; and
J. means operable to lock each baffle panel to be in radial alignment with the axis of the rotor.

* * * * *